Patented Nov. 23, 1943

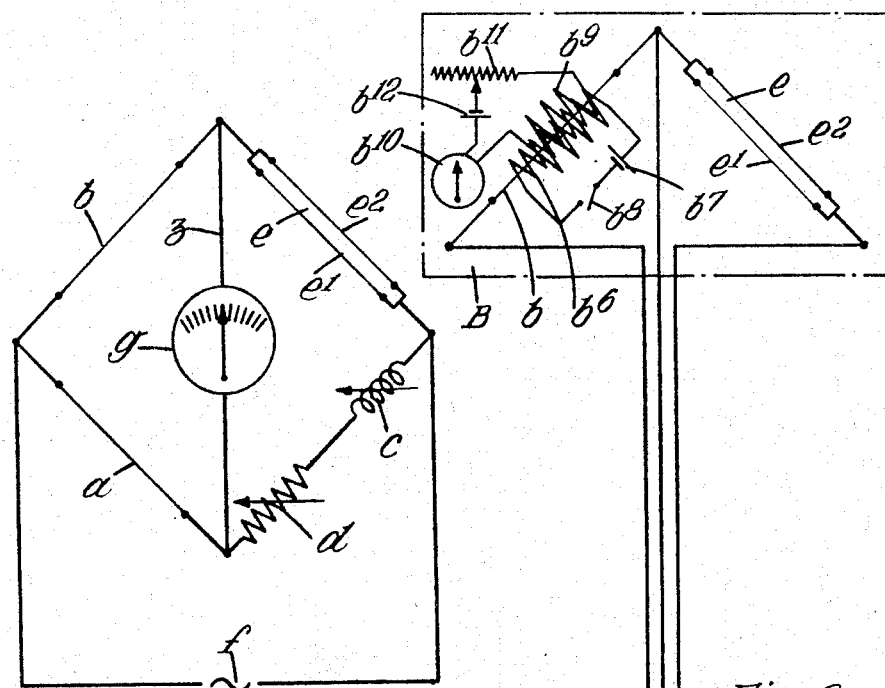
Fig. 1.
Fig. 3.
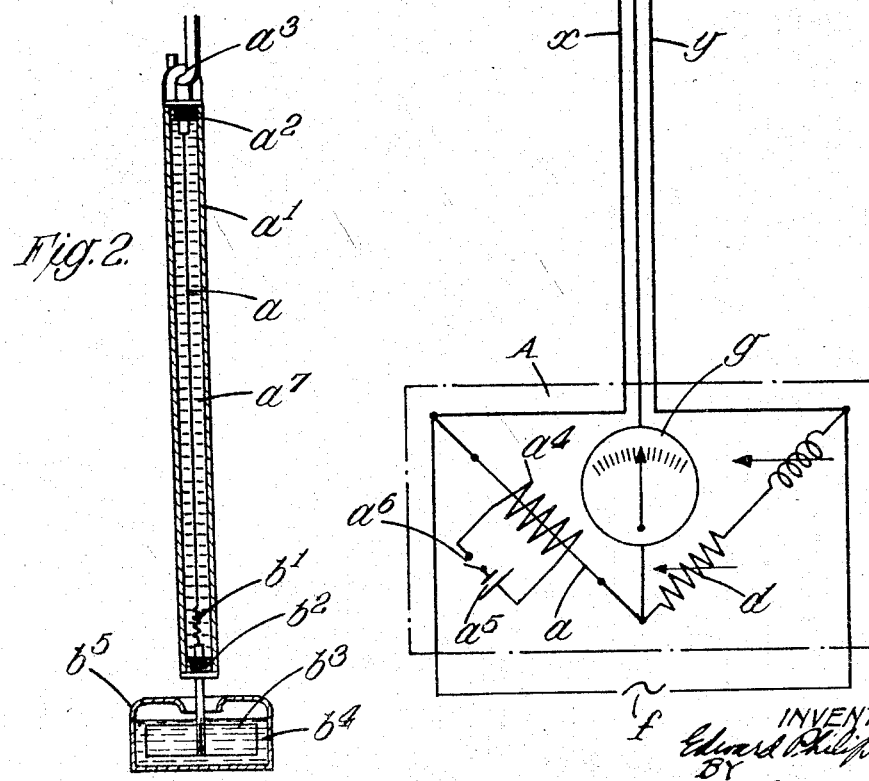
Fig. 2.

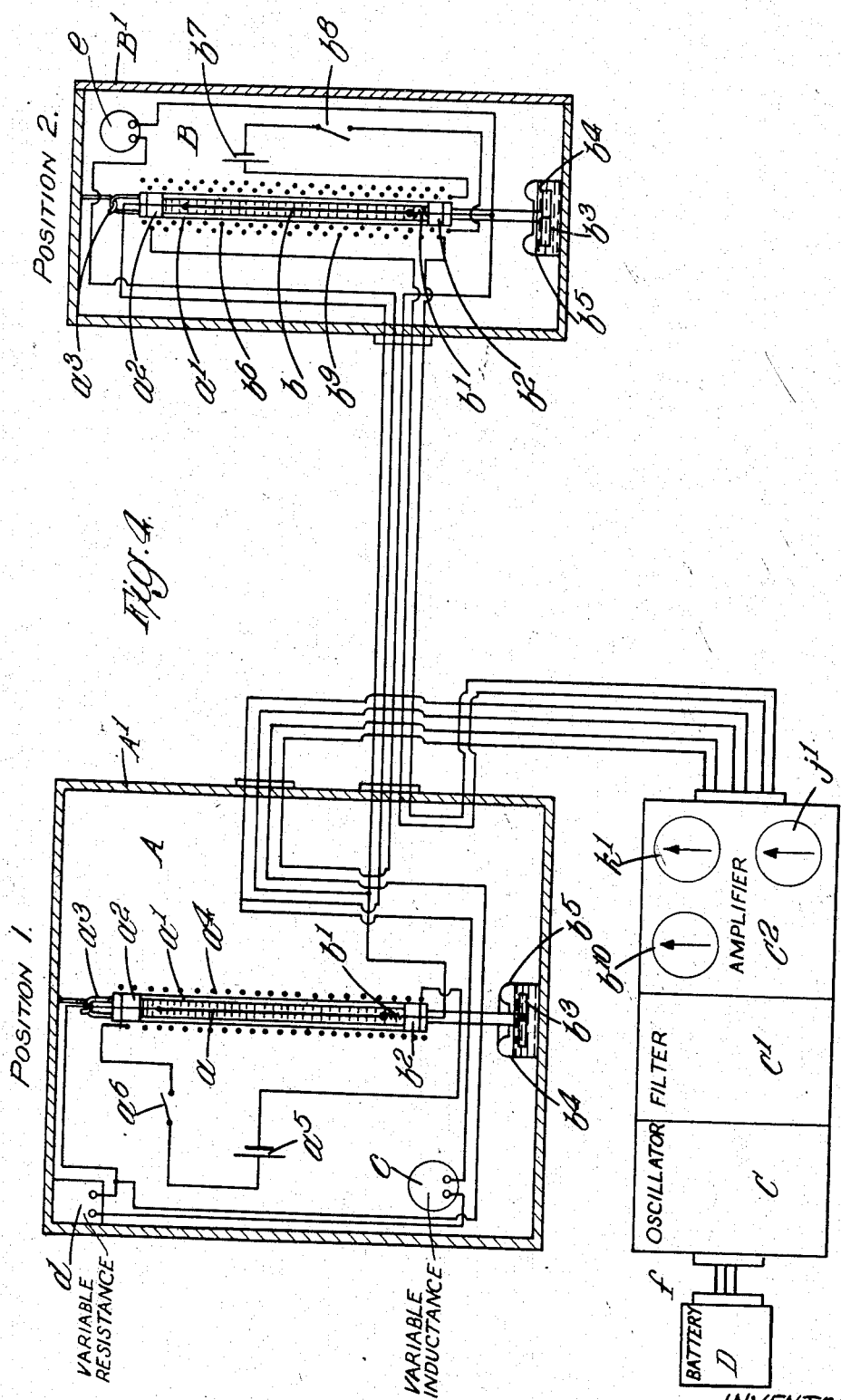

2,335,117

UNITED STATES PATENT OFFICE 2,335,117

MAGNETIC SURVEYING APPARATUS

Edward Philip Harrison, Barkingside, England, assignor of one-third to Arthur Joseph Hughes, Chigwell Row, Essex, England, and one-third to Henry Hughes & Son Limited, London, England, a British limited-liability company Application July 23, 1940, Serial No. 346,975
In Great Britain July 25, 1939

4 Claims. (Cl. 175—183)

This invention relates to improved magnetic surveying apparatus for use on or near to the surface of the earth and has for its object to constitute an instrument which can be used more expeditiously in the field, which is of a robust character suitable for use in the field, which is devoid of delicately poised moving parts and which can be produced at less cost than is possible with known devices for a similar purpose.

It is known that the impedance of a suitably annealed wire composed of a high permeability nickel-iron alloy properly supported and carrying alternating electrical current decreases when the axial component of the external magnetic field increases. It is this property of high permeability substances, such as a nickel-iron alloy, that I employ in my improved magnetic surveying apparatus.

If two such wires of high permeability nickel-iron alloy, known commercially as Mumetal, are separately mounted and kept near together and located vertically or horizontally and placed in adjacent arms of a bridge, the latter may be balanced. When, however, one of the wires of high permeability nickel-iron alloy is removed to a position some distance from the first wire, the bridge balance will be upset provided the vertical field at a distance is different from that in location of balance. The amount of "out of balance" as shown in the indicating instrument is a measure of the difference in magnetic field value between the two positions.

The invention consists of an improved magnetic surveying apparatus in which the change in impedance of a wire of high permeability nickel-iron alloy is employed to detect a change in the external magnetic field and is characterised in that two such similar wires are arranged as two arms in a balanced alternating current bridge network and that means are provided for determining the correction necessary to restore the balance when the impedance of one of the said wires changes due to a change in the external magnetic field.

In order that the nature of the invention may be the better understood, examples thereof will now be described in relation to the accompanying drawings, reference being had to the several figures thereof and to the letters of reference thereon, like reference letters referring to similar or equivalent parts in the different figures in which:

Figure 1 is a diagram showing the basic arrangement;

Figure 2 is a detail view showing one arrangement of a wire of high permeability nickel-iron alloy;

Figure 3 is a development of Figure 1;

Figure 4 is a diagrammatic showing of the instrument arrangements in the development according to Figure 3.

Figure 5:
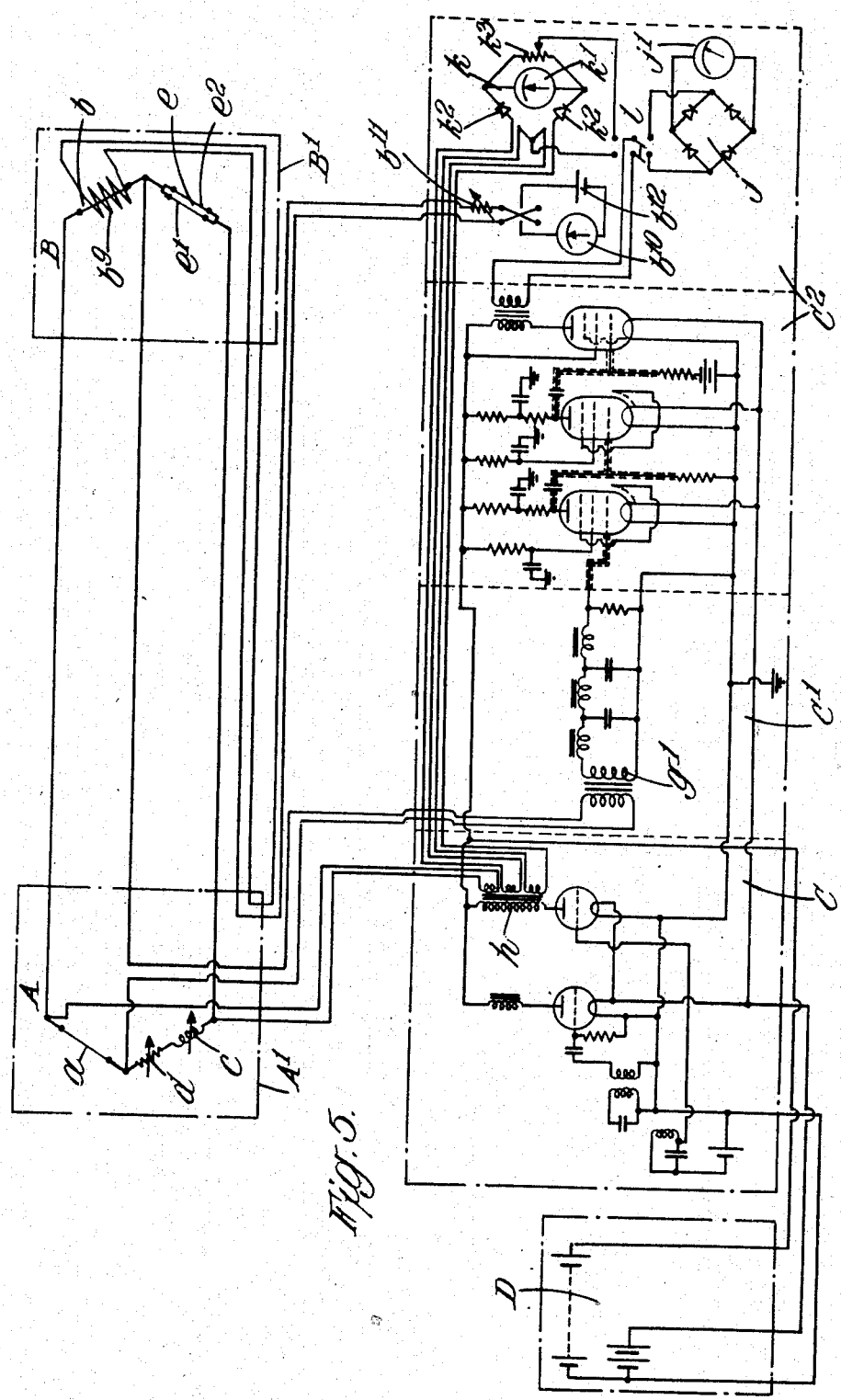
Figure 5 is an electrical diagram of a conveniently arranged installation applicable to Figure 4, but omitting the local polarising circuits to avoid confusion.

The basis of the instrument shown in Figure 1 is an alternating current Wheatstone bridge network of which $a$ and $b$ are two similar wires of an appropriate alloy possessing the property referred to above, $c$ is a variable inductance in series with a variable non-inductive resistance $d$, $e$ is an inductively arranged fixed resistance having an impedance temperature coefficient similar to that of $a$ or $b$ and an impedance substantially the same as that of $a$ or $b$ or $c$ and $d$, $f$ is a source of alternating current and $g$ is a current indicating meter.

The wires $a$ and $b$ usefully may be about nine inches long and .0175 inch in diameter, corresponding to No. 26 S. W. G., and may be composed of an alloy comprising about 16.6% of iron and about 77.3% of nickel, together with say 5% of copper and small percentages of manganese, chromium, silicon and/or other elements to give the high permeability characteristic. It is essential that such wire should be supported without material strain and in the present instance convenient results have been obtained when the wire $a$ (or $b$) is enclosed (see Figure 2) in a tube $a^1$ of electrical insulating material (such as of paper impregnated with an artificial resin) being positively anchored to the metal terminal $a^2$ at the upper end, whilst its lower end is connected to the spiral spring $b^1$ positively anchored to the metal terminal $b^2$. The interior of the tube $a^1$ has a filling $a^7$ of viscous material, for example a paraffin such as petroleum jelly, and one or more solenoids are wound upon the exterior of $a^1$ for polarising and/or compensating purposes. When measuring the vertical component of the earth's magnetic field the wires $a$ and $b$ have to be arranged vertically and for this purpose the terminal $a^2$ includes a suspension $a^3$ which may be an articulated universal joint, a ball and socket, a loop and hook (with or without knife edges) or a metal filament, undue oscillation of the suspended element being damped by vanes $b^3$, mounted on the lower terminal $b^2$, immersed in a liquid $b^4$ (such as oil or other liquid of a suitable viscosity) contained in a non-spill vessel $b^5$.

In order that the fixed resistance $e$ shall have the same impedance temperature coefficient as that of the high permeability nickel iron alloy of which the wires $a$ and $b$ are composed, the said resistance consists of two wires $e^1$ and $e^2$ which are electrically connected in the circuit in series or parallel and are composed of non-ferromagnetic materials which comply with the following considerations.

It is assumed that at temperature $\theta°$ the resistance of $e^1$ is equal to that of $e^2$ and the resistance temperature coefficients are $\gamma$ and $\epsilon$ respectively. It can be shown that if the temperature is raised, the resistance temperature coefficient $\alpha$ of the combination is given by:

$\alpha$ is equal to $$\frac{\gamma+\epsilon}{2+\gamma+\epsilon}$$

or more approximately $$\frac{\gamma+\epsilon}{2}$$

if squares and products of coefficients are neglected. The resistance temperature coefficient of a suitable high permeability nickel iron alloy may be considered to be .0024. The coefficient for platinum is .0038 and a copper zinc alloy such as brass, the resistance temperature coefficient of which is .001, can be selected so that if the wire $e^1$ is of platinum and the wire $e^2$ is of the selected brass and the wires are of equal electrical resistance at temperature $\theta°$ the required conditions of impedance temperature coefficient balance will exist at temperature $(\theta+\delta\theta)°$. Although platinum and brass have been referred to, it will be clear that any non-ferromagnetic material may be used such as tin and manganin or like alloy with a very small resistance temperature coefficient or aluminum and brass for example, which in this instance satisfy the condition:

$$\frac{\gamma+\epsilon}{2}$$

is approximately equal to .0024, so that in this approximation $\gamma+\epsilon$ can be regarded as equal to .0048.

When summarised, the conditions to be fulfilled are: (I) The sum of the resistance temperature coefficients of the materials used for the wires $e^1$ and $e^2$ in parallel must be equal to .0048. (II) The wires $e^1$ and $e^2$ must be of the same length and have the same resistance at some temperature $\theta°$, which for example may be the average day temperature. (III) The total resistance of the parallel combination should suit the resistance of each of the wires $a$ or $b$ of high permeability nickel-iron alloy approximately. (IV) The inductance of the combination (usually when wound on a cylindrical former) must be approximately equal to the inductance of each of the wires $a$ or $b$.

Some approximation is necessary but if wires of aluminum and brass are chosen, it has been found to be convenient to combine two wires each about 2 ohms in resistance. For instance, three hundred and fifteen centimetres of No. 34 S. W. G. aluminum wire has a resistance of about 2 ohms and the diameter of a brass wire three hundred and fifteen centimetres in length which has a resistance of 2 ohms can be obtained from:

$$a = \frac{\rho \times l}{R} = \frac{\pi}{4}d^2$$

where $\rho$ = the specific resistance in microhms per square centimetre.
$l$ = the length of the wire in centimetres.
$d$ = the diameter of the wire in centimetres.
$a$ = the area of the wire in square centimetres.
$R$ = the resistance of the wire in ohms.

Thus for brass wire:

$$d = 2\sqrt{\frac{\rho \times l}{R\pi}} = 2\sqrt{\frac{7 \times 10^{-6} \times 315}{2\pi}}$$

$$= .036 \text{ centimetre}$$

so the conditions are satisfied with stock commodities if three hundred and fifteen centimeters of 34 S. W. G. aluminum wire is arranged in electrical parallel with an equal length of 28 S. W. G. brass wire.

In practice the brass and aluminum wires are insulated from one another and connected at their ends by soldering or welding to form a parallel combination which can be wound closely on a cylindrical bobbin having a groove say five-sixteenths of an inch wide and a core diameter of say one inch.

As the bridge network is symmetrical, any effects due to change of frequency and/or change of amplitude of the alternating current from the source $f$ are negligible and, provided that the impedance temperature coefficient of $e$ is the same as that of $a$ and/or $b$, effects due to differences of temperature between $a$ and $b$ may be ignored.

From the above it will be seen that the Wheatstone bridge network described above can be divided so as to constitute two instruments A and B as shown in Figure 3, connected only by a three core cable consisting of the midwire $z$ and the conductors $x$ and $y$ conveying electrical current to the distant instrument B.

If it is assumed that the magnetic field is constant throughout the region of the instrument A, the condition for no current in $g$ (so far as the resistance component of the impedance is concerned) is:

$$\frac{\text{the ohmic resistance of } a}{\text{the ohmic resistance of } c} = \frac{\text{the ohmic resistance of } b}{\text{the ohmic resistance of } e \text{ and } d}$$

and this relation continues to hold for so long as the instrument B is close to instrument A.

When, however, the instrument B is removed to a position distant to the instrument A, the balance of the bridge will be upset if the earth's field is different in the two positions and the value of the impedance correction will be a measure of the field intensity difference.

Since the change of effective resistance of a wire of high permeability nickel iron alloy, placed in zero or very small fields up to (say) 0.1 gauss, is very small (the resistance-field curve being nearly parallel to the field axis throughout this region) in order to achieve the necessary sensitivity in a survey instrument when dealing with any components of the field near to zero, it is necessary to polarise the element so as to utilise a portion of the field resistance curve whose slope is greater than it is very near to zero field. To carry this into effect a convenient method is to wind a solenoidal coil over the element and its mounting, and pass a suitable current through this coil thus applying to the wire an artificial field of any required value. According to the directions of this current, positive or negative fields may be applied to the wire of high permeability nickel-iron alloy. The principle of polarising the magnetic element may be extended to wires of high permeability nickel-iron alloy in any position whether vertical or horizontal and forms a very convenient method of reducing to zero any out-of-balance indications on the meter, thus throwing back the determination of a magnetic field or change of field on to a determination of electric current and the constants of a solenoid.

In the practical embodiment of the instruments A and B as shown in Figure 4, they are enclosed in non magnetic cases $A^1$ and $B^1$ respectively, the tube $a^1$ containing the wire $a$ has a winding $a^4$ connected with a battery $a^5$ through a switch $a^6$ and the tube $a^1$ containing the wire $b$ has a winding $b^6$ connected with a battery $b^7$ through a switch $b^8$, so that the wires $a$ and $b$ can be polarised. The winding $b^6$ is overwound with a compensating coil $b^9$ having a milliammeter $b^{10}$ and a variable resistance $b^{11}$ in series circuit with a direct current source $b^{12}$. The instruments A and B as a whole are electrically energized by a unit comprising the oscillator C, filter $C^1$ and amplifier rectifier $C^2$ (described in relation to Figure 5) associated with a battery unit D.

The instruments A and B are used as follows: assume A is in position 1 and the vertical component of the earth's magnetic field is to be measured at position 2.

The instruments A and B are placed close together at position 1, $a$ and $b$ are polarised, $c$ and $d$ are adjusted to balance the bridge network, B is moved to position 2 and $b^{11}$ is adjusted to balance the bridge again. The reading of the milliammeter $b^{10}$ will be a measure of the change of magnetic field and can be calibrated to read in magnetic units.

A convenient arrangement for generating the necessary alternating electrical current is shown in Figure 5 in which A and B are the surveying instruments side by side. C is a thermionic oscillator producing an alternating current at, for example, about 500 alternations per second. The output from C is applied to A and B through the transformer $h$. The out-of-balance current from A and B is passed through the two-stage constant-K-type low pass filter $C^1$ cutting off at about 800 cycles per second to prevent any of the harmonics generated in $a$ and $b$ passing to the amplifier $C^2$. The amplifier $C^2$ is a resistance capacity coupled amplifier with two high frequency pentodes and a power pentode output transformer coupled to the circuit $j$ or the circuit $k$ by means of the switch $l$.

The circuit $j$ includes a current meter $j^1$ and an associated rectifier bridge so as to enable approximate balance of the main bridge to be effected, whilst the circuit $k$ includes a centre zero micro-ammeter $k^1$, rectifiers $k^2$ polarised by the outputs from the transformer $h$ and a rheostat $k^3$ having a variable tapping.

If initially the circuit $k$ has been adjusted by $k^3$ so that $k^1$ indicates zero when the input from the main bridge is nil, any decrease in the impedance in one arm of the main bridge will produce a deflection to one side of zero and any change in the other arm will produce a deflection to the other side, the value of the deflections positive or negative being proportional to the change of impedance in the main bridge arms and being a function of the change which has occurred in the magnetic field when B was moved away from A.

When instruments of the kind referred to above are to be used to measure a horizontal component of the earth's field, the wires $a$ and $b$ are arranged horizontally and the cases $A^1$ and/or $B^1$ are provided with turntable mountings so that adjustment in azimuth can be effected easily.

In some cases the wires $a$ and $b$ and the solenoids $a^4$ and $b^6$ $b^9$ respectively are arranged in nonmagnetic clamps pivotally mounted on a support with a suspension $a^3$ and vanes $b^3$ by means of a counterpoised indexing contrivance which ensures the location of the wire of high permeability nickel-iron alloy either in a vertical or a horizontal position.

A magnetic survey over a long line may by one or other of these methods be carried out by a step by step process but the resistance of the connecting leads between A and B must not be too large compared with the resistance of one of the wires of high permeability nickel-iron alloy otherwise the sensitivity of the latter will be swamped by circuit conditions.

I claim:

1. A magnetic surveying apparatus comprising balancing means having two arms including similar conductors of high permeability, a third arm including an adjustable impedance and a fourth arm including a fixed non-ferromagnetic resistance, said non-ferromagnetic resistance comprising two metal strips of substantially the same resistance at a given temperature and wound together inductively, the impedance temperature coefficient of the combined metal strips being substantially the same as the impedance temperature coefficient of each of said high permeability conductors.

2. In a magnetic surveying apparatus provided with a substantially straight elongated conductor having a characteristic which changes due to changes in the external magnetic field, a support for said conductor including a point of support by which the conductor is adapted to assume consistent and accurate positions by action of gravity and means to dampen any tendency of the conductor to swing upon the one point support.

3. A magnetic surveying apparatus comprising balancing means divided into two relatively movable parts, each of said parts being provided with a similar conductor of high permeability connected in circuit with the balancing means, an adjustable impedance associated with one of said conductors, a fixed non-ferromagnetic resistance associated with the other of said conductors, means providing a source of alternating current for said conductors, means for filtering the out-of-balance current due to difference in the external magnetic fields affecting said conductors to suppress harmonics generated in said conductors, and means responsive to the out-of-balance current for indicating the difference in the external magnetic fields.

4. A magnetic survey apparatus, comprising an alternating current bridge network, having two arms including similar conductors composed of an annealed high permeability nickel-iron alloy, a third arm including an adjustable impedance and a fourth arm including a fixed non-ferromagnetic resistance, said non-ferromagnetic resistance comprising two metal strips of substantially the same resistance at a given temperature and wound together inductively, the impedance temperature coefficient of the combined metal strips being substantially the same as the impedance temperature coefficient of each of said high permeability conductors.

EDWARD PHILIP HARRISON.